(12) United States Patent
Robinson et al.

(10) Patent No.: US 9,497,500 B1
(45) Date of Patent: Nov. 15, 2016

(54) SYSTEM AND METHOD FOR CONTROLLING EXTERNAL DISPLAYS USING A HANDHELD DEVICE

(75) Inventors: Brent Robinson, Fayetteville, AR (US); Susan Robinson, Fayetteville, AR (US)

(73) Assignee: Fly-N-Hog Media Group, Inc., Bentonville, AR (US)

( * ) Notice: Subject to any disclaimer, the term of this patent is extended or adjusted under 35 U.S.C. 154(b) by 0 days.

(21) Appl. No.: 13/412,429

(22) Filed: Mar. 5, 2012

Related U.S. Application Data

(60) Provisional application No. 61/448,990, filed on Mar. 3, 2011, provisional application No. 61/537,337, filed on Sep. 21, 2011.

(51) Int. Cl.
| | | |
|---|---|---|
| *G09G 5/00* | (2006.01) | |
| *H04N 21/41* | (2011.01) | |
| *G06F 3/01* | (2006.01) | |
| *H04N 21/482* | (2011.01) | |
| *H04N 21/436* | (2011.01) | |
| *G06F 3/0488* | (2013.01) | |
| *H04N 21/422* | (2011.01) | |
| *H04N 21/4725* | (2011.01) | |
| *H04N 21/4223* | (2011.01) | |
| *H04N 5/44* | (2011.01) | |

(52) U.S. Cl.
CPC .......... *H04N 21/4126* (2013.01); *G06F 3/011* (2013.01); *G06F 3/04883* (2013.01); *H04N 5/4403* (2013.01); *H04N 21/4223* (2013.01); *H04N 21/42207* (2013.01); *H04N 21/42209* (2013.01); *H04N 21/42222* (2013.01); *H04N 21/42224* (2013.01); *H04N 21/43615* (2013.01); *H04N 21/4725* (2013.01); *H04N 21/4828* (2013.01)

(58) Field of Classification Search
CPC . G06F 3/011; G06F 3/04883; H04N 5/4403; H04N 2005/4407; H04N 2005/441; H04N 2005/4428

USPC ................................................ 345/156-184
See application file for complete search history.

(56) References Cited

U.S. PATENT DOCUMENTS

| | | | | |
|---|---|---|---|---|
| 8,200,246 | B2* | 6/2012 | Khosravy | G06Q 30/0241 345/156 |
| 8,860,667 | B2* | 10/2014 | Hattori | G06F 3/0482 345/169 |
| 2004/0078169 | A1* | 4/2004 | Oba | G06F 1/1626 702/186 |
| 2007/0109266 | A1* | 5/2007 | Davis | G06F 3/002 345/163 |
| 2009/0240488 | A1* | 9/2009 | White | G06F 3/0236 704/9 |
| 2009/0259498 | A1* | 10/2009 | Halavais | G06Q 10/02 705/5 |
| 2009/0276805 | A1* | 11/2009 | Andrews, II | G06Q 30/02 725/35 |
| 2009/0318168 | A1* | 12/2009 | Khosravy | G06Q 30/0241 455/456.3 |
| 2011/0122063 | A1* | 5/2011 | Perlman | A63F 13/355 345/161 |
| 2011/0138317 | A1* | 6/2011 | Kang | G06F 3/011 715/780 |
| 2012/0081287 | A1* | 4/2012 | Kim | G06F 9/44 345/168 |
| 2016/0182958 | A1* | 6/2016 | Milano | H04N 5/44 725/43 |

\* cited by examiner

*Primary Examiner* — Christopher E Leiby
(74) *Attorney, Agent, or Firm* — Fish & Richardson P.C.

(57) ABSTRACT

An control interface and system is provided that allows users to use a handheld device to communicates with an electronic billboard through a host server. The interface allows users to display information, as well as interact with information that is displayed on the electronic billboard. In order to establish this communication, a user, through their handheld device, communicates with a host server, which provides them with one or more available services that they can invoke in order to communicate with the display.

21 Claims, 13 Drawing Sheets

SYSTEM AND METHOD FOR CONTROLLING EXTERNAL DISPLAYS USING A HANDHELD DEVICE

CROSS-REFERENCE TO RELATED APPLICATIONS

This application claims the benefit under 35 U.S.C. §119 (e)(1) of prior U.S. provisional application 61/448,990, filed Mar. 3, 2011, entitled "SYSTEM AND METHOD FOR CONTROLLING EXTERNAL DISPLAYS USING A HANDHELD DEVICE," and U.S. provisional application 61/537,337, filed Sep. 21, 2011, entitled "SYSTEM AND METHOD FOR CONTROLLING EXTERNAL DISPLAYS USING A HANDHELD DEVICE," the contents of which applications are incorporated by reference herein in their entireties.

TECHNICAL FIELD

This invention relates to wireless interfaces, and more particularly to wireless control of electronic billboards.

BACKGROUND

The growth of dynamic advertisement through the use of electronic billboards placed in public spaces has not only enabled multiple advertisers to utilize the same physical space to display their advertisements, but has also expanded the type of advertisements that an advertiser can publically display. For example, multiple advertisers can now use a single or group of public display to display advertisements with dynamic content to the same target group.

SUMMARY

In general, a user may rely on a handheld device, such as a wireless smartphone, to interface with an external display (e.g., a flat panel display television) in order to retrieve information relevant to the user. More specifically, the handheld device may include an application that links to a database that selectively invokes one or more network based services for the user based on, among other things, the environment and context of the user and the mission of the display operator. For example, an advertiser may position external displays throughout an airport. The external displays may be linked to a network that manages one or more services that are rendered on the external display. The services may be configured to inspire user interaction so that the user may retrieve relevant information and also so that the display operator may sell advertising. Depending on the environment, the advertising value may reflect a premium and/or content may be selectively changed based on the certain and/or projected viewership of the advertisement placed in an environment in which one or more users are known to be looking at the external display based upon the determination that the user is accessing advanced functionality being rendered on the display and/or the content of such functionality being accessed.

DESCRIPTION OF DRAWINGS

Like reference symbols in the various drawings indicate like elements.

DETAILED DESCRIPTION

Figure 1:
FIG. 1 illustrates a system that facilitates a display interface application on a handheld device to enable mapping content to be displayed on a third party display screen.

In one aspect, a user may configure an electronic billboard, such as an external or third party display, through their handheld device. The user's handheld device may be configured with an application that enables the handheld device to access a host that may then access the electronic billboard. The application may transmit identification characteristics to the host, which enables the host to access the correct electronic billboard. One class of identification characteristics may be determined from the handheld device's geographic information that may be determined from the handheld device's internal GPS system and/or antenna signal triangulation. A second class of identification characteristics may be determined from optical information that may be captured through the handheld device's camera system. A third class of identification characteristics may be determined from audio information that may be captured through the handheld device's sound recorder. A fourth class of identification characteristics may be determined from information that may be captured through the handheld device's key pad and/or touch pad. The handheld device may process the information characteristics into a format readable by the host and/or send the information characteristics in its original format, to the host. In some instances, the handheld device may determine, from the information characteristics, the electronic billboard that the user wishes to configure. In other instances, the host may determine, from the information characteristics, the electronic billboard that the user wishes to configure.

The information characteristics may also be stored in the handheld device for use at a later time. In such a configuration, a user, may first obtain the information characteristic and wait for a later time to access this information. In some instances, information characteristics may be determined from information obtained from the handheld device throughout a user's day. In particular, the information characteristics may be determined by a user's movement throughout the day. Based on this movement, the application and/or the host may be able to determine a set of electronic billboards that the user passed throughout the day and be able to allow the user to select a specific billboard that they wished to configure.

Upon determining which electronic billboard the user wished to configure, the host may provide a service interface to the user, which is associated with the electronic billboard. The user may interact with the service interface through a service user interface accessible through the user's handheld device. For example, the service user interface may be configured to allow the user, through their handheld device, to upload information, facilitate financial transactions associated with the uploading the information and allow the user to preview the information on the display. The service user interface may be configured with security features to determine the identity of the user accessing the service and may be configured to exclude certain users from accessing it.

In a second aspect, a user may interact with an advertisement displayed on an electronic billboard. The user's handheld device may be configured with an application which enables the handheld device to access a host that may then access the advertisement on the electronic billboard. The application may transmit identification characteristics to the host, which enables the host to access the correct electronic billboard. One class of identification characteristics may be determined from the handheld device's geographic information that may be determined from the handheld device's internal GPS system and/or antenna signal triangulation. A second class of identification characteristics may be determined from optical information that may be captured through the handheld device's camera system. A third class of identification characteristics may be determined from audio information that may be captured through the handheld device's sound recorder. A fourth class of identification characteristics may be determined from information that may be captured through the handheld device's key pad and/or touch pad. The handheld device may process the information characteristics into a format readable by the host and/or send the information characteristics in its original format, to the host. In some instances, the handheld device may determine, from the information characteristics, the electronic billboard that has the advertisement that the user wishes to interact with. In other instances, the host may determine, from the information characteristics, the electronic billboard that has the advertisement that the user wishes to interact with.

The information characteristics may also be stored in the handheld device for use at a later time. In such a configuration, a user, may first obtain the information characteristic and wait for a later time to access this information. In some instances, information characteristics may be determined from information obtained from the handheld device throughout a user's day. In particular, the information characteristics may be determined by a user's movement throughout the day. Based on this movement, the application and/or the host may be able to determine a set of electronic billboards that the user passed throughout the day and be able to allow a user to either select a specific billboard's advertisement and/or be able to choose a list showing all of the advertisements displayed by the set of electronic billboards.

Upon determining which advertisement the user wished to interact with, the host may provide a service interface to the user, which is associated with the electronic billboard displaying the advertisement. The user may interact with the service interface through a service user interface accessible through the user's handheld device. For example, the service user interface may provide the user with various options for interacting with the advertisement, such as linking the user to a secure sales portal, providing the user with other similar advertisement offers, and/or downloading the advertisement in a format that may be displayed, read, and/or stored on the handheld device. The service portal interface may also be configured to allow the user to send a version of the advertisement to other people through, for instance, e-mail or social media formats. The service user interface may be configured with security features to determine the identity of the user accessing the service and may be configured to exclude certain users from accessing it.

FIG. 1 is an illustration of a system 100 that includes handheld devices 110 and 120 that can interface with a display 130. In handheld device 110, a user is presented with an application that enables the user to identify categories and services proximate to the user. For example, the user may select the restaurant control shown in handheld device 110 to generate the display shown in handheld device 120. In handheld device 120, a list of restaurants is shown. The application is linked to a server (not shown), which in turn controls the applications that are being rendered using external display 130. As shown, the restaurants retrieved using handheld display 120 are rendered within external display 130 with a list of the locations shown on a map. In association with the retrieved external display content, the external display 130 includes an advertisement, such as a beverage and a stock ticker as shown, which can be dictated by the retrieved content. In addition, the advertisements and/or the stock ticker may be used to command additional viewership based on additional traffic, which may be viewing the display.

Figure 2:
FIG. 2 illustrates a system that facilitates a display interface application on a handheld device to enable gaming content to be displayed on a third party display screen.

FIG. 2 is an illustration of a system 200 that includes handheld devices 210 and 220 that can interface with a display 230. Handheld device 210 includes a list of services that are available within the application that interfaces with the external display 230. Some of the services may access various news feeds. Other services may include personalized content, such as a stream of the user's social networking updates, geolocation services, or messaging with other users. In the illustrated example, the user has selected the games option 210, which leads to a menu of games shown in handheld device 220. The selection of the game leads to the external device 230 to serve as the output for game. The game is shown alongside an advertisement and a stock ticker.

Note that the environment may determine which options and services are available. For example, if multiple users are contending for the same display, options that include social networking and/or games involving one player may be removed or direct to another display. On the other hand, for example, in less trafficked hours, other services may be presented which afford a more permissive degree of control over a display. The values and costs associated with different instances of advertising may be modified to reflect the degree of use and/or projected traffic and may also be used to establish priority (e.g. display content and/or control can be prioritized to maximize advertising revenue and the proprietor's sales).

Figure 3:
FIG. 3 illustrates a system that facilitates a display interface application on a handheld device to enable local events to be displayed on a third party display screen.

FIG. 3 is an illustration of a system 300 that includes handheld devices 310 and 320 that can interface with an external display 330. In handheld device 310, the user has selected a service that identifies local events of interest. For example, the user may select events by location, category, or genre. The external display 330 then illustrates a list of concerts in July. The user may interact with the listed events shown on the larger display in order to order tickets for the concert or associated merchandise. And, although another user may not be controlling the external display, another user may use an application linking to the same display to retrieve and/or order information related to the events and/or advertisements shown. The other user not controlling display may select a "take information" or similar button in a display in order to retrieve a link or business card to the display, event, or advertisement shown. Thus, even if the user controlling the display makes changes using their own handheld device to effectuate changes to the external display 330, the other user viewing the same display still may be permitted to retain access to relevant information that was surfaced. The value of advertising and/or information displayed may be modified to reflect the relative value that the information displayed holds for additional users.

Figure 4:
FIG. 4 illustrates a system that facilitates a display interface application on a handheld device to receive menu order information on the handheld device in conjunction with order information being displayed on a third party display screen.

FIG. 4 is an illustration of a system 400 that includes a handheld device 410 that interfaces with an external display 420 to present information of both personal and general interest. The handheld device includes an indication of the application being used, a menu, and a message from an ordering service indicating that an order for food will be ready in 10 minutes. The external display 420 includes a display of a menu in addition to a message for "BRENT" indicating that a previously placed order is ready. Thus, a controller for the external display 430 may be configured to manage a display by tracking which users are currently participating in a local service and ticker personalized messages through the external display 420 based on input received from other systems (e.g., an order placement and restaurant management system or drive-through ordering system). The external display may be configured to present additional information based on the degree of use. For example, during periods of heavy use, the duration of the ticker may be limited while periods of light use may permit the external display 430 to extend the duration of a tickered message and/or offer additional games and/or promotional advertisements (e.g., a happy hour special to facilitate additional ordering).

Figure 5:
FIG. 5 illustrates a system that facilitates a display interface application on a handheld device to enable movie clips to be displayed on a third party display screen.

FIG. 5 is an illustration of a system 500 that includes handheld devices 510 and 520 that can interface with a display 530 in order to render excerpts of a movie clip. For example, the application shown in handheld device 510 may include a movie clip option that is presented in facilities determined to be proximate to a movie theater. The user then may interface with the display shown in handheld device 520 in order to select a movie clip. The movie clip then may be rendered on external display 530.

Like the example of the movie clips, the selective inclusion of one or more services may turn on an extent to which a server is configured to understand the information need at a given location. For example, an airport environment may include travel related options for flight status, rescheduling, local accommodation, and rental cars. In contrast, an information kiosk in New York may include information about Broadway shows, taxi information, and museum information. In the same manner, the system can be configured as an interactive jukebox or music controller, allowing a user to select a music service (e.g. Pandora, iTunes) through the user's handheld device or preselected music content associated with the external display device.

Figure 6:
FIGS. 6 and 7 illustrates a system that facilitates a display interface application on a handheld device to enable displaying of pieces of content on separate viewing windows on a third party display screen.

FIG. 6 is an illustration of a system 600 that includes handheld devices 610 and 620 that can interface with a display 630 in order to present information not suitable for the limited display of a handheld device. For example, because the complexity of financial tools may not be suitable for the limited display of a handheld device, a user may use the handheld display 620 as control and display of sensitive information (e.g., portfolio size and ordering information), while the external display 630 is used for rendering complex analytical tools (e.g., valuation models). The external display 630 may be compartmentalized so that even if an external display is used for personal use, information relevant to a larger audience is rendered.

Figure 7:

FIG. 7 is an illustration of a system that includes handheld devices 710 and 720 that can interface with an external display 730. Handheld device 710 illustrates that an application linking to an external display (through a server not shown) is presented and accessible alongside other devices. For example, handheld device 720 illustrates that the application may be used to play a trivial game that is rendered on external display 730. As shown, the answers are selected on the handheld device 720 while the question is rendered on external display 730. Because an advertiser can know that a user is connected to server viewing external display and participating in a game, the value of the advertising shown on external display 730 may be modified to reflect a number of users participating in a game. Thus, having five users in a game may command five times the advertising revenue. In addition, advertising time of display may be dependent on the number of users participating as well as priority advertising (e.g. advertisers may pay a premium for their content to be displayed during high volume user interaction).

Figure 8:
FIG. 8 illustrates a system that facilitates a display interface application on a handheld device to interact with a game presented on a third party display screen.

FIG. 8 is an illustration of a system 800 that includes a handheld device 810 configured to interface with a third-party display device 820, such as a theater-based display (as shown in FIG. 8), stadium/concert based display, or electronic billboard. For example, the handheld device 810 includes an application linking to a gaming application on a server (not shown) that controls theater-based display 820. Using their handheld device 810, the user may select the "WIN FREE POPCORN" button and/or the movie advertisement for the movie shown in order to respond to the advertisement. In one configuration, the user selects advertising-related buttons that are shown on the handheld display 810 to mirror the options shown on the theater-based display. In another configuration, the user may capture or select a portion of the theater-based display, for example, by taking a picture using a camera within the handheld device 810, using a beam-based selector, or using the handheld device to control a cursor that is presented on the theater-based display. The same system can be used to pole participants at a political rally or engage fans at a sporting event.

Figure 9:
FIG. 9 illustrates a system that facilitates a display interface application on a handheld device to enables sport's scores to be displayed on a third party display screen.

FIG. 9 is an illustration of a system 900 that includes a handheld device 910 that interfaces with a display 920 to control a sports display. Often times, changing a channel becomes cumbersome for support staff. The application on the handheld device 910 may be used to first give a user the option to view scores for different games, select which channel is being rendered, and/or work with other users collectively to determine which content is being rendered.

For example, a list of user choices for different games may be shown. In a place with three external displays 930, the top three most games receiving votes may be shown. Users then may be permitted to vote for different content at different times in order to determine which content is rendered. Thus, while a user may initially vote for a less popular game, the user then may work with other users to recast their votes in order to select content that is better than the content shown. A business proprietor also may configure the frequency at which a channel is changed and/or designate certain displays for special use. Thus, the largest display in a restaurant being shown in Little Rock Airport always may be reserved for Arkansas Razorback football, while permitting flexible use of additional displays. Likewise, the business proprietor may engage in a degree of content filtering, so that, for example, rival football teams are not displayed at a specified facility.

Figure 10:
FIG. 10 illustrates a system that facilitates a display interface application on a handheld device to enable interfacing with an advertisement on a third party display screen in order to create a shopping list.

FIG. 10 is an illustration of a system 1000 that includes a handheld device 1010 that interfaces with an external display 1020 to facilitate placement of orders. As shown, a user may select an advertisement shown in external display 1020. The order then turns up in a receipt that can be used to take receipt of goods purchased at a local retailer or online retailer. For example, a user may present a receipt within an application on their handheld device 1010 for authorization to take delivery of purchased goods from the retailer. In addition to displaying advertising, through which the user may purchase goods, additional content may be displayed in order to inspire continued viewing of the external display 1020 (and thus facilitate additional purchases).

Figure 11:
FIG. 11 illustrates a system that facilitates a display interface application on a handheld device to transmit reservation and menu order information from the handheld device in conjunction with seating information displayed on a third party display screen.

FIG. 11 is an illustration of a system 1100 that includes a handheld device 1110 that interfaces with an external display 1120 to facilitate enrollment of users in a waiting list, such as for seating at a restaurant or queuing up users at the department of motor vehicles. In the example shown in FIG. 11, the application has been configured to both enable users to enroll while also tickering a message indicating a table for a specified user (Susan) is ready. The application also includes a projected seating time for an additional user. Note that the enrollment system may be associated with an order placement system so that the user may order food in advance of being seated to expedite customer service.

Figure 12:
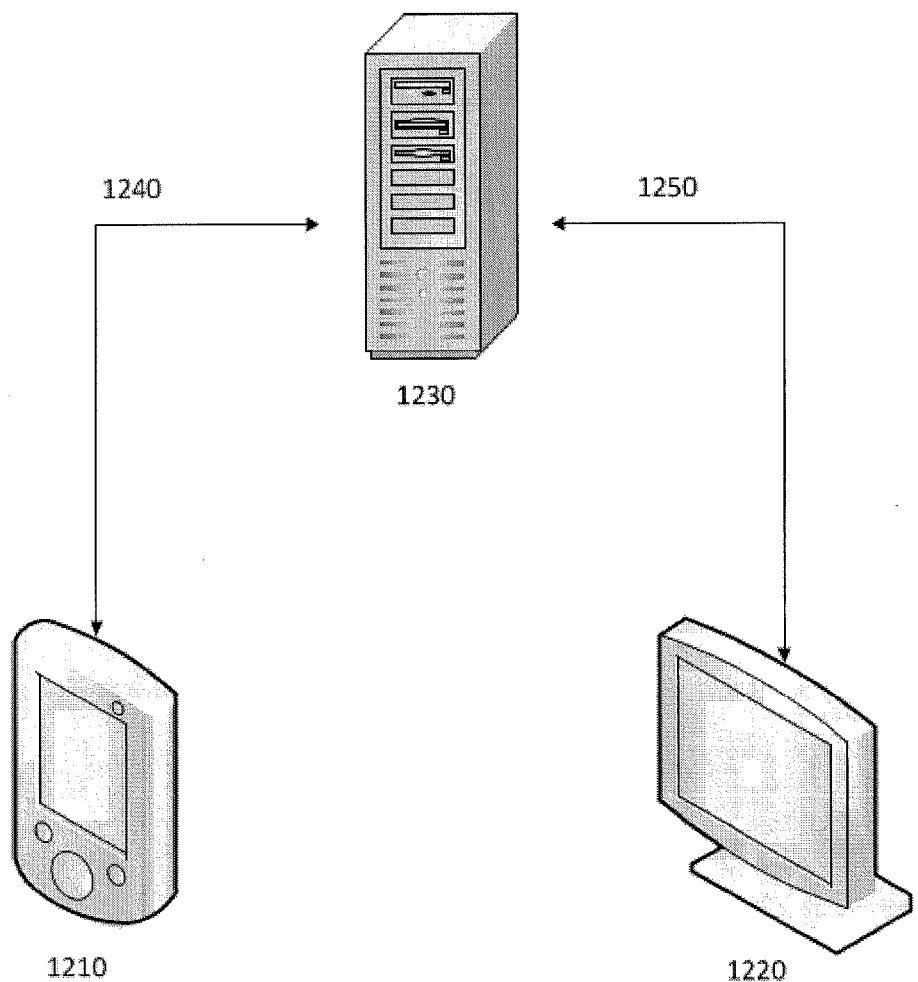
FIG. 12 is a network diagram showing the connection between a handheld device and an electronic billboard through a server.

FIG. 12 shows an exemplary configuration of a handheld device 1210 and an electronic billboard 1220 communicating through a host server 1230. The handheld device 1210 is configured to communicate with the host server 1230 through a display interface application software. The display interface application software may reside on the handheld device 1210. Alternatively, the display interface application software may reside remotely from the handheld device 1210. In such instances, the handheld device 1210 may be configured to communicate with the host server 1230 through a web browser and/or through a communication application running on the handheld device 1210.

The handheld device 1210 can communicate with the host server 1230 through network communication path 1240. Network communication path 1240 may be configured in any number of protocols such as SSL, VPN, and may be facilitated through a wireless connection such as through a 3G/4G, Bluetooth or Zigby connection.

Similarly, the electronic billboard 1220 can communicate with the host server 1230 through communication path 1250. Secure communication path 1250 may be configured in any number of protocols such as SSL or VPN, and may be facilitated through a wired or wireless connection such as through Ethernet, optical fiber, 3G/4G, Bluetooth or Zigby connection.

Additionally, communication path 1250 may include a display server, which is configured to control the content displayed on the electronic billboard 1220. In such instance, the display server may be configured to receive display control information from the host server 1230, which are then communicated to the electronic billboard 1220.

The host server 1230 can comprise one or more processor enabled computing devices that are configured to host a number of software applications that operate together to provide the host server functionality. Host server 1230 may also comprise electronic storage mediums (e.g. magnetic and/or solid state memory), which may be configured to store information pertaining to control options for the electronic billboard 1220. The information may be related to business rules and algorithms that are applied in order to determine available services to handheld device 1320.

Figure 13:
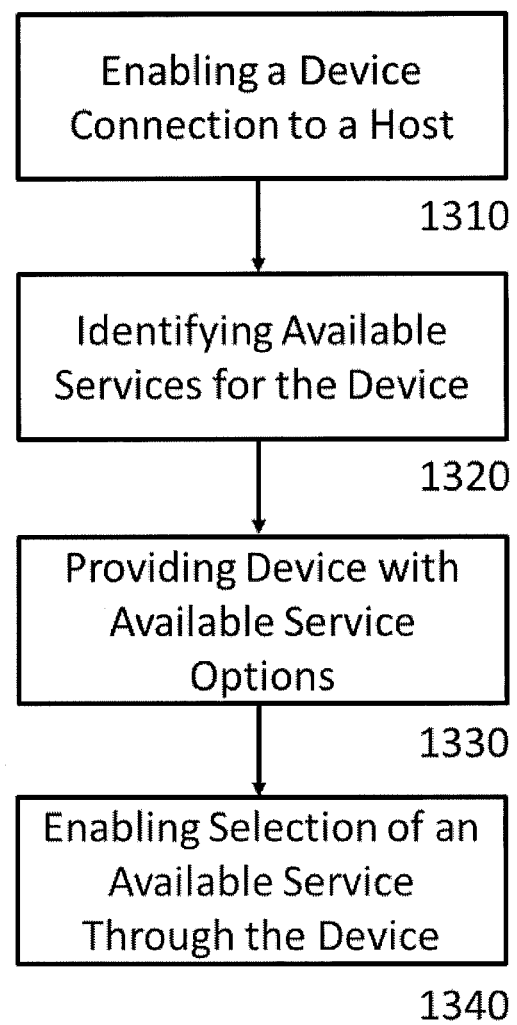
FIG. 13 is a diagram showing a process for enabling a connection between a handheld device and an electronic billboard through a server.

FIG. 13 describes a process for enabling a connection between a handheld device and an electronic billboard. At 1310, a handheld device is enabled to communicate with a host server. The host server identifies which display control services are available to the handheld device at 1320 and provides the handheld device with the available service options a 1330. Additionally, selection of one or more of the available services is enabled at 1340

The disclosed and other embodiments can be implemented as one or more computer program products, i.e., one or more modules of computer program instructions encoded on a computer readable medium for execution by, or to control the operation of, data processing apparatus. The one or more modules may be implemented in hardware. The computer readable medium can be a machine-readable storage device, a machine-readable storage substrate, a memory device, or a combination of one or more them. The term "data processing apparatus" may encompass an apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a computer program include, by way of example, both general and special purpose microprocessors, multi-core processors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include various forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. Some storage devices may be cloud-based storage devices. The processor and the memory can be supplemented by, or incorporated in, special purpose logic circuitry. The computer may be implemented in a personal computer (PC), a tablet, a portable electronic device, a cell phone (e.g, a smart phone), or some as part of other electronic device that enables the participant to view and edit video content.

To provide for interaction with a participant, some implementations of the subject matter described in this specification can be implemented on a computer having a display device, e.g., a CRT (cathode ray tube), LCD (liquid crystal display), LED (light emitting diode), plasma display monitor, an organic display module, etc. for displaying information to the participant and a keyboard and a selector, e.g., a pointing device, a mouse, or a trackball, a touch sensor, by which the participant can provide input to the computer. Other kinds of devices can be used to provide for interaction with a participant as well; for example, feedback provided to the participant can be any form of sensory feedback, e.g., visual feedback, auditory feedback, or tactile feedback; and input from the participant can be received in any form, including acoustic, speech, or tactile input.

While this document contains many specifics, these should not be construed as limitations on the scope that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

What is claimed is:

1. A method comprising:
    enabling an external display at a particular location to access, from a content source, a general stream of information for a plurality of user devices associated with a plurality of users based within the particular location, wherein:
        each of the plurality of user devices comprise a mobile application that establishes a communication pathway between each of the plurality of user devices, the external display, and the content source; and
        the general stream of information specifies a particular advertisement that is provided for display on the external display, and user-selectable content for a product included within the particular advertisement;
    enabling, the external display to display the accessed general stream of information for the plurality of user devices;
    receiving, from a particular user device from among the plurality of user devices, a user selection of content for the product included within the particular advertisement;
    identifying, based on the received user selection of content, a list of available services provided by the content source associated with the product included within the particular advertisement;
    receiving, from the particular user device, an instruction to invoke a selected service from the list of available services;
    in response to receiving the instruction from the particular user device to invoke the selected service, computing an updated availability for the selected service within the particular location, wherein the updated availability for the selected service indicates that the selected service has been selected by the particular user; and
    updating, based at least on computing the updated availability for the selected service within the particular location, the accessed general stream of information that is determined to be applicable to a plurality of user devices associated with a plurality of users within the particular location, wherein updating the accessed general stream of information comprises:
        generating a notification indicating that the particular user has already invoked the selected service, and
        generating an updated list of available services for the plurality of users within the particular location that does not include the selected service; and
    in response to updating the accessed general stream of information, (i) transmitting an instruction to the external display to display the updated general stream of information that is determined to be applicable to the plurality of user devices associated with the plurality of users within the particular location, and (ii) transmitting the notification to the plurality of user devices within the particular location.

2. The method of claim 1 further comprising upon invoking one or more of the list of available services, providing, to the particular user device, display information associated with the one or more of the list of available services.

3. The method of claim 2, wherein the display information is associated with an advertisement.

4. The method of claim 3 further comprising enabling the particular user device to create a shopping list.

5. The method of claim 2, wherein the display information is associated with a game.

6. The method of claim 1, wherein enabling the particular user device to connect to the host further comprises identifying a user through a user identity.

7. The method of claim 6, wherein identifying the list of available services is based on a user identity.

8. The method of claim 1 further comprising determining the particular location of the plurality of user devices.

9. The method of claim 1, wherein the particular location is determined based on the geographic location of the particular user device.

10. The method of claim 9, wherein the geographic location of the particular user device is determined based on a set of GPS coordinates of the particular user device.

11. The method of claim 1, wherein the list of available services comprises at least one of news feeds, personalized content associated with the plurality of users, social networking updates, geolocation services, or availability of products associated within the particular location.

12. An apparatus, comprising:
one or more processors; and
logic encoded in one or more non-transitory media for execution by the one or more processors, and when executed operable to:
enabling an external display at a particular location to access, from a content source, a general stream of information for a plurality of user devices associated with a plurality of users based within the particular location, wherein:
each of the plurality of user devices comprise a mobile application that establishes a communication pathway between each of the plurality of user devices, the external display, and the content source; and
the general stream of information specifies a particular advertisement that is provided for display on the external display, and user-selectable content for a product included within the particular advertisement;
enabling the external display to display the accessed general stream of information for the plurality of user devices;
receiving, from a particular user device from among the plurality of user devices, a user selection of content for the product included within the particular advertisement;
identifying, based on the received user selection of content, a list of available services provided by the content source associated with the product included within the particular advertisement;
receiving, from the particular user device, an instruction to invoke a selected service from the list of available services;
in response to receiving the instruction from the particular user device to invoke the selected service, computing an updated availability for the selected service within the particular location, wherein the updated availability for the selected service indicates that the selected service has been selected by the particular user; and
updating, based at least on computing the updated availability for the selected service within the particular location, the accessed general stream of information that is determined to be applicable to a plurality of user devices associated with a plurality of users within the particular location, wherein updating the accessed general stream of information comprises:
generating a notification indicating that the particular user has already invoked the selected service, and
generating an updated list of available services for the plurality of users within the particular location that does not include the selected service; and
in response to updating the accessed general stream of information, (i) transmitting an instruction to the external display to display the updated general stream of information that is determined to be applicable to the plurality of user devices associated with the plurality of users within the particular location, and (ii) transmitting the notification to the plurality of user devices within the particular location.

13. The apparatus of claim 12 further comprising upon invoking one or more of the list of available services, providing, to the particular user device, display information associated with the one or more of the list of available services.

14. The apparatus of claim 13, wherein the display information is associated with an advertisement.

15. The method of claim 3 further comprising enabling the particular user device to create a shopping list.

16. The apparatus of claim 13, wherein the display information is associated with a game.

17. The apparatus of claim 12, wherein enabling the particular user device to connect to the host further comprises identifying a user through a user identity.

18. The apparatus of claim 17, wherein identifying the list of available services is based on a user identity.

19. The apparatus of claim 12 further comprising determining the particular location of the plurality of user devices.

20. The apparatus of claim 12, wherein the particular location is determined based on the geographic location of the particular user device.

21. The apparatus of claim 20, wherein the geographic location of the particular user device is determined based on a set of GPS coordinates of the particular user device.

* * * * *